United States Patent
Hernandez et al.

(10) Patent No.: US 11,659,006 B2
(45) Date of Patent: *May 23, 2023

(54) COMPUTER ENVIRONMENT COMPLIANCE

(71) Applicant: Kyndryl, Inc., New York, NY (US)

(72) Inventors: Milton H. Hernandez, Tenafly, NJ (US); Anup Kalia, Elmsford, NY (US); Brian Peterson, Ridgefield, CT (US); Vugranam C. Sreedhar, Yorktown Heights, NY (US); Sai Zeng, Yorktown Heights, NY (US)

(73) Assignee: Kyndryl, Inc., New York, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/131,945

(22) Filed: Dec. 23, 2020

(65) Prior Publication Data

US 2021/0120041 A1 Apr. 22, 2021

Related U.S. Application Data

(63) Continuation of application No. 15/796,014, filed on Oct. 27, 2017, now Pat. No. 10,979,456.

(51) Int. Cl.
*G06F 16/23* (2019.01)
*H04L 9/40* (2022.01)
(Continued)

(52) U.S. Cl.
CPC .............. *H04L 63/20* (2013.01); *H04L 43/08* (2013.01); *H04L 47/20* (2013.01); *H04L 63/1433* (2013.01); *H04L 67/10* (2013.01)

(58) Field of Classification Search
CPC ......... H04L 63/20; H04L 43/08; H04L 47/20; H04L 63/1433; H04L 67/10
See application file for complete search history.

(56) References Cited

U.S. PATENT DOCUMENTS 8,707,384 B2 4/2014 Jain et al.
2008/0244690 A1 10/2008 Kulkarni et al.
(Continued)

FOREIGN PATENT DOCUMENTS

CN 101446907 B 6/2011
WO 2009102653 A1 8/2009

OTHER PUBLICATIONS

Office Action for U.S. Appl. No. 15/796,014 dated Aug. 29, 2019, 33 pages.
(Continued)

*Primary Examiner* — Padma Mundur
(74) *Attorney, Agent, or Firm* — VanLeeuwen & Vanleeuwen; Daniel C. Housley

(57) ABSTRACT

An assessment component that facilitates assessment and enforcement of policies within a computer environment can comprise a compliance component that determines whether a policy, that defines one or more requirements associated with usage of one or more enterprise components of an enterprise computing system, is in compliance with a plurality of standardized policies that govern operation of the one or more enterprise components of the enterprise computing system. The assessment component can also comprise a policy optimization component that determines one or more changes to the policy that achieve the compliance with the plurality of standardized polices based on a determination that the policy complies with a first standardized policy of the plurality of standardized policies and fails to comply with a second standardized policy of the plurality of standardized policies.

13 Claims, 10 Drawing Sheets

(51) Int. Cl.
*H04L 67/10* (2022.01)
*H04L 47/20* (2022.01)
*H04L 43/08* (2022.01)

(56) References Cited

U.S. PATENT DOCUMENTS

| | | |
|---|---|---|
| 2009/0205011 A1 | 8/2009 | Jain et al. |
| 2012/0096373 A1 | 4/2012 | Aguera y Arcas et al. |
| 2013/0035799 A1 | 2/2013 | Song et al. |
| 2013/0081101 A1 | 3/2013 | Baer et al. |
| 2014/0165137 A1 | 6/2014 | Balinsky et al. |
| 2014/0359691 A1 | 12/2014 | Woods et al. |
| 2014/0365787 A1 | 12/2014 | Sagar et al. |
| 2015/0195374 A1 | 7/2015 | Wang et al. |
| 2015/0281287 A1 | 10/2015 | Gill et al. |
| 2018/0025011 A1* | 1/2018 | Aksionkin ............ G06F 16/125 707/692 |
| 2018/0270229 A1 | 9/2018 | Zhang et al. |
| 2019/0036971 A1 | 1/2019 | Ford et al. |

OTHER PUBLICATIONS

Office Action for U.S. Appl. No. 15/796,014 dated Mar. 19, 2020, 42 pages.
Office Action for U.S. Appl. No. 15/796,014 dated Aug. 11, 2020, 78 pages.
International Search Report and Written Opinion received for PCT Application Serial No. PCT/IB2018/057725 dated Jan. 30, 2019, 9 pages.
U.S. Appl. No. 15/796,014, filed Oct. 27.

* cited by examiner

COMPUTER ENVIRONMENT COMPLIANCE

BACKGROUND

The subject disclosure relates to computer environments, and more specifically, to assessing and enforcing computer policy regulations within computer environments.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate assessment of computer policy regulations are described.

According to an embodiment, a system can comprise a memory that stores computer executable components, and a processor that executes the computer executable components stored in the memory. The computer executable components of the system can comprise a compliance component that determines whether a policy, that defines one or more requirements associated with usage of one or more enterprise components of an enterprise computing system, is in compliance with a plurality of standardized policies that govern operation of the one or more enterprise components of the enterprise computing system. The computer executable components of the system can also comprise a policy optimization component that determines one or more changes to the policy that achieve the compliance with the plurality of standardized polices based on a determination that the policy complies with a first standardized policy of the plurality of standardized policies and fails to comply with a second standardized policy of the plurality of standardized policies.

According to another embodiment, a computer program product for assessing policy compliance can comprise a computer readable storage medium having program instructions embodied therewith. The program instructions can be executable by a processor and the processor can determine whether a policy, that defines one or more requirements associated with usage of one or more enterprise components of an enterprise computing system, is in compliance with a plurality of standardized policies that govern operation of the one or more enterprise components of the enterprise computing system. The program instructions can also be executable to determine one or more changes to the policy that achieve the compliance with the plurality of standardized polices based on a determination that the policy complies with a first standardized policy of the plurality of standardized policies and fails to comply with a second standardized policy of the plurality of standardized policies.

According to another embodiment, a computer-implemented method is provided. The computer-implemented method can comprise determining, by a device operatively coupled to a processor, whether a policy that defines one or more requirements associated with usage of one or more enterprise components of an enterprise computing system, is in compliance with a plurality of standardized policies that govern operation of the one or more enterprise components of the enterprise computing system The computer-implemented method can also comprise, determining, by the device, one or more changes to the policy that achieve the compliance with the plurality of standardized polices based on a determination that the policy complies with a first standardized policy of the plurality of standardized policies and fails to comply with a second standardized policy of the plurality of standardized policies.

According to yet another embodiment, a system can comprise a memory that stores computer executable components, and a processor that executes the computer executable components stored in the memory. The computer executable components of the system can comprise a compliance component that determines whether a policy, that defines one or more requirements associated with usage of one or more enterprise components of an enterprise computing system, is in compliance with one or more regulations that govern operation of the one or more enterprise components of the enterprise computing system. The computer executable components of the system can also comprise a policy optimization component that, based on a determination that the policy does not comply with the one or more regulations, determines one or more changes to the policy to achieve the compliance with the one or more regulations.

According to yet another embodiment, a computer program product for assessing policy compliance can comprise a computer readable storage medium having program instructions embodied therewith. The program instructions can be executable by a processor and the processor can determine whether a policy that defines one or more requirements associated with usage of one or more enterprise components of an enterprise computing system, is in compliance with one or more regulations that govern operation of the one or more enterprise components of the enterprise computing system. The program instructions can also be executable to determine one or more changes to the policy to achieve the compliance with the one or more regulations based on a determination that the policy does not comply with the one or more regulations.

In some embodiments, one or more of the above elements described in connection with the systems, computer-implemented methods and/or computer program programs can be embodied in different forms such as a computer-implemented method, a computer program product, or a system.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In some scenarios, a computer of a service provider can enforce a computer environment policy based on one interpretation of a regulation (e.g., health insurance portability and accountability act (HIPAA), federal financial institutions examination council (FFIEC), payment card industry data security standard (PCI-DSS)), and a computer associated with a customer of the service provider can have another interpretation of a regulation. Thus, the difference in the interpretations can yield a difference in computer-based policies and policy enforcement for enterprise computer systems. Additionally, some policies should be enforced immediately after a risk is assessed. However, if policies are not kept up-to-date, then the correct policy may not be enforced in response to an assessed risk, and a server device may remain in noncompliance. Therefore, a process to ensure a coherence and standardize policy enforcement between customer and service provider regulation interpretation is disclosed herein.

One or more embodiments described herein include systems, computer-implemented methods, apparatus, and computer program products that facilitate assessing policy compliance.

Figure 1:
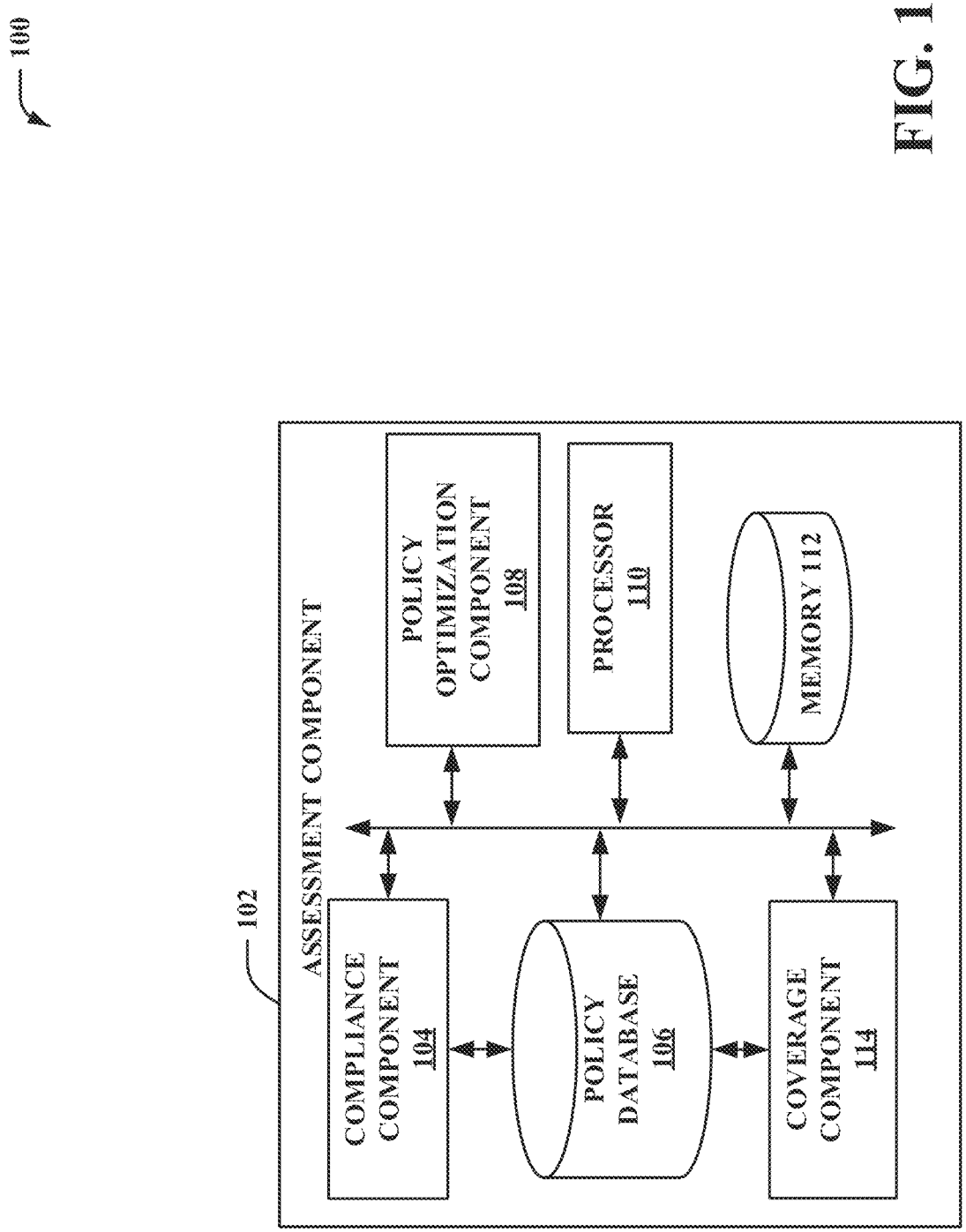
FIG. 1 illustrates a block diagram of an example, non-limiting system that facilitates assessing policy compliance in accordance with one or more embodiments described herein.

FIG. 1 illustrates a block diagram of an example, non-limiting system that facilitates assessing and remediating policy compliance in accordance with one or more embodiments described herein.

An assessment component 102 of a policy assessment system 100 can be employed to use hardware and/or software to solve problems that are highly technical in nature (e.g., comparing policy data, resolving a policy conflict based on data comparison, determining a risk associated with a computer, allocating policy requirements based on comparison data, etc.), that are not abstract and that cannot be performed as a set of mental acts by a human due to the processing capabilities needed to facilitate assessing and enforcing computer policy regulations, for example. Further, some of the processes performed may be performed by a specialized computer for carrying out defined tasks related to memory operations. For example, a specialized computer can be employed to carry out tasks related to policy enforcement on a graphical user interface (GUI) or the like.

The assessment component 102 can comprise various sub-components including, but not limited to: a compliance component 104, a policy optimization component 108, a coverage component 114, etc. Furthermore, the compliance component 104 can comprise a policy database 106. It should be noted that in other embodiments, the policy database 106 can be internal to the compliance component 104, the coverage component 114, and/or the assessment component 102. It should also be noted that the sub-components of the assessment component 102 can be configured for bi-directional communication between the sub-components.

Aspects of the processor 110 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the assessment component 102. In an aspect, the assessment component 102 can also include memory 112 that stores computer executable components and instructions.

The coverage component 114 can receive regulation data associated with various regulations and standards (e.g., HIPAA, FFIEC, PCI-DSS, etc.). The coverage component 114, which provides a first level analysis, can identify multiple set policies. For example, the coverage component 114 can identify a customer policy, which is in scope of a regulation and a standard, a customer policy, which is above and beyond the regulation and the standard, and a policy in the regulation and the standard which is not covered by the customer policy. If policies are in scope of the regulation and the standard, then other components (e.g., the compliance component 104, the optimization component 108, etc.) can be utilized. The policy database 106 can store the regulation data, in addition to various customer policies, for future use. Customer policies can include, but are not limited to: logging requirements, password requirements, credit card number requirements, etc. The coverage component 114 can also determine whether a customer policy is in scope or goes above and beyond a targeted regulation. For example, the customer logging mechanism can require that every log entry for any activity performed by the end user is prefixed with the end user's email address in order to determine any activity at a system and/or application level. This policy is not a part of any of the requirements for any of the existing regulations and standards (e.g., HIPAA, FFIEC, PCI-DSS, etc.). Thus, the coverage component 114 can determine that the policy is out of scope with the existing regulations and standards.

The compliance component 104 can receive regulation data associated with various regulations and standards (e.g., HIPAA, FFIEC, PCI-DSS, etc.). The policy database 106 can store the regulation data, in addition to various customer policies, for future use. Customer policies can include, but are not limited to: password length requirements, password special character requirements, credit card number requirements, etc. The compliance component 104 can also determine whether a customer policy is in conformance of a targeted regulation. For example, the compliance component 104 can determine if a customer's password policy is in compliance with a HIPAA regulation. The HIPPA regulation can stipulate that all passwords must be of at least an eight character length. Consequently, if the customer password policy is less than the requirement for eight characters (e.g., seven characters and below), then the customer policy can be flagged as non-compliant with the HIPAA regulation. Alternatively, if the customer password policy is eight characters or more, then the customer policy can be flagged as being compliant with the HIPAA regulation.

In an alternative embodiment, the policy optimization component can also determine if there are multiple regulations for which a customer must remain compliant. For example, the customer could be required to remain in compliance with both HIPAA and FFIEC regulations simultaneously. However, one regulation requirement (e.g., eight password character requirement) can be more restrictive than the other regulation requirements (e.g., four password character requirement). In this scenario, the policy optimization component can identify the more restrictive requirement, and can enforce the more restrictive requirement (e.g., eight password character requirement) to ensure that the customer is in compliance with both regulations. One process facilitating enforcement of the more restrictive requirement can comprise the policy optimization component 108 overriding a current policy of the customer so that the customer's policy becomes compliant. The policy optimization component 108 can also enforce policies based on the type of organization issuing the regulation. For example, a governmental regulation can be enforced more rigidly than a regulation associated with a non-governmental account. It should also be noted that in some scenarios, the customer's policies can be more restrictive than the regulation. Therefore, the policy optimization component 108 may not need to be utilized to optimize the customer's policy.

Furthermore, the enforcement can also depend on a server type. In a scenario where multiple server devices are utilized, different levels of implementation can exist for the same policy depending on the type of server (e.g., internet server, development server, etc.). Therefore, in some scenarios, customer devices can be allowed to override the assessment component 102 to apply different policies to different servers. Because more restrictive policies can cost more to implement, policy provisions, optimization, and changes, can also be implemented based on the cost and/or risk versus reward of the policy implementation.

It should be appreciated that in some embodiments facilitating policy compliance can result in a classification of policies. Such classification can employ a probabilistic and/or statistical-based analysis to prognose or infer an action that can be performed. A support vector machine (SVM) is an example of a classifier that can be employed. The SVM can operate by finding a hypersurface in the space of possible inputs. Other directed and undirected classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority. The disclosed aspects can employ classifiers that are explicitly trained (e.g., via a generic training data) as well as implicitly trained (e.g., via observing the input terms usage as it relates to software code, receiving extrinsic information, and so on).

Figure 2:
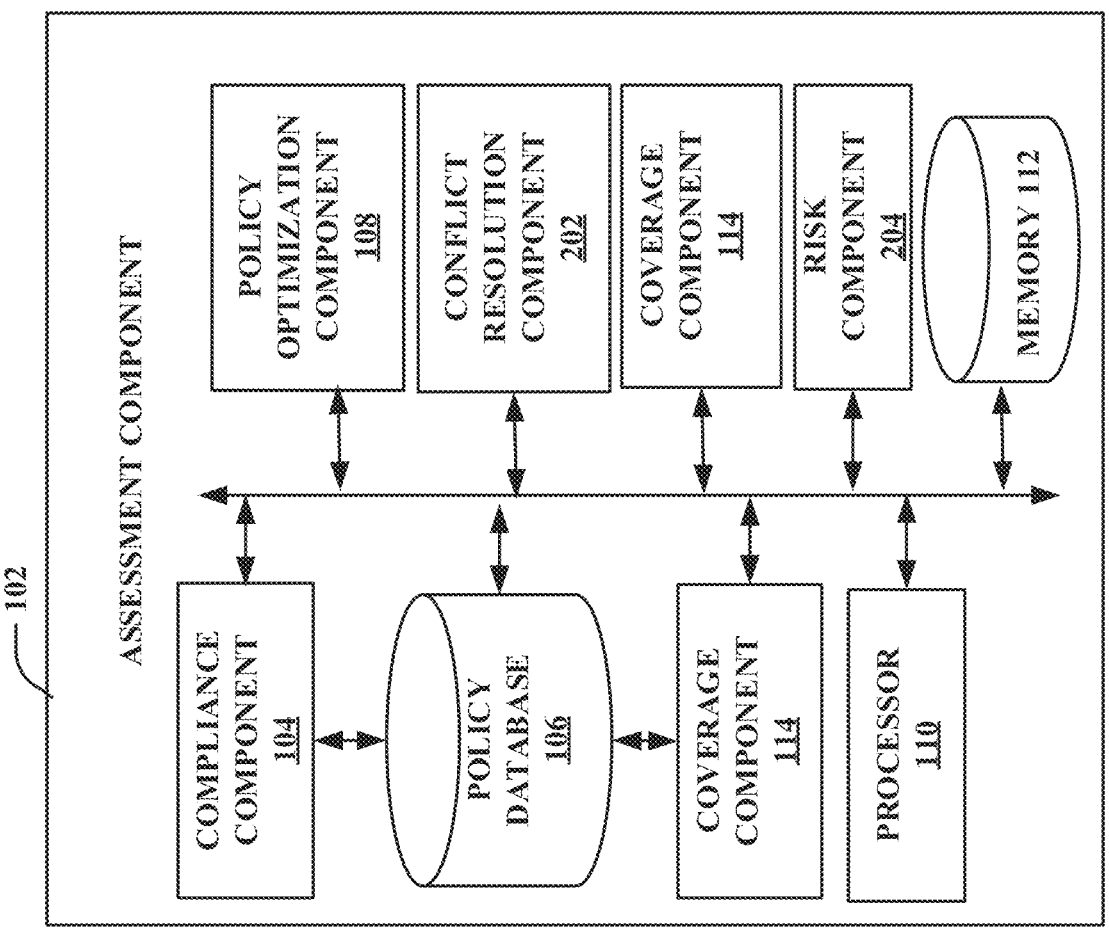
FIG. 2 illustrates another block diagram of an example, non-limiting system that facilitates assessing policy compliance comprising a risk component and a conflict resolution component in accordance with one or more embodiments described herein.

FIG. 2 illustrates another block diagram of an example, non-limiting system that facilitates assessing policy compliance comprising a risk component and a conflict resolution component in accordance with one or more embodiments described herein. Repetitive description of like elements employed in other embodiments described herein is omitted for sake of brevity.

In another embodiment, assessment system 200 can comprise a conflict resolution component 202, and risk component 204 as sub-components of the assessment component 102. The conflict resolution component 202 can compare policy data associated with one policy to policy data associated with another policy to determine conflicting elements between the policies. Thereafter, the conflict resolution component 202 can remove any conflicting elements in accordance with a regulation. For example, if one policy stipulates that all password letters must be capitalized and another policy stipulates that all password letters must be lowercase, then the conflict resolution component 202 can identify the conflict and remove one of the stipulations so that the policies are in sync (e.g., both policies stipulate all password letters must be capitalize or all password letters must be lowercase).

Consequently, the risk component 204 can determine risk scores associated with the aforementioned conflicting elements. For example, generally using all lowercase letters in a password is considered a lower level of security than using capitalized letters. Therefore, the risk component 204 can assign a high risk score to any conflicting elements associated with using all lowercase letters. The risk score can be assigned either before, during, or after the conflicting element has been removed. Additionally, the policy optimization component 108 can select a policy (e.g., all capitalized password letters) as an optimal policy based on its association with a low risk score and further determine one or more changes to the policy to further optimize the policy.

Figure 3:
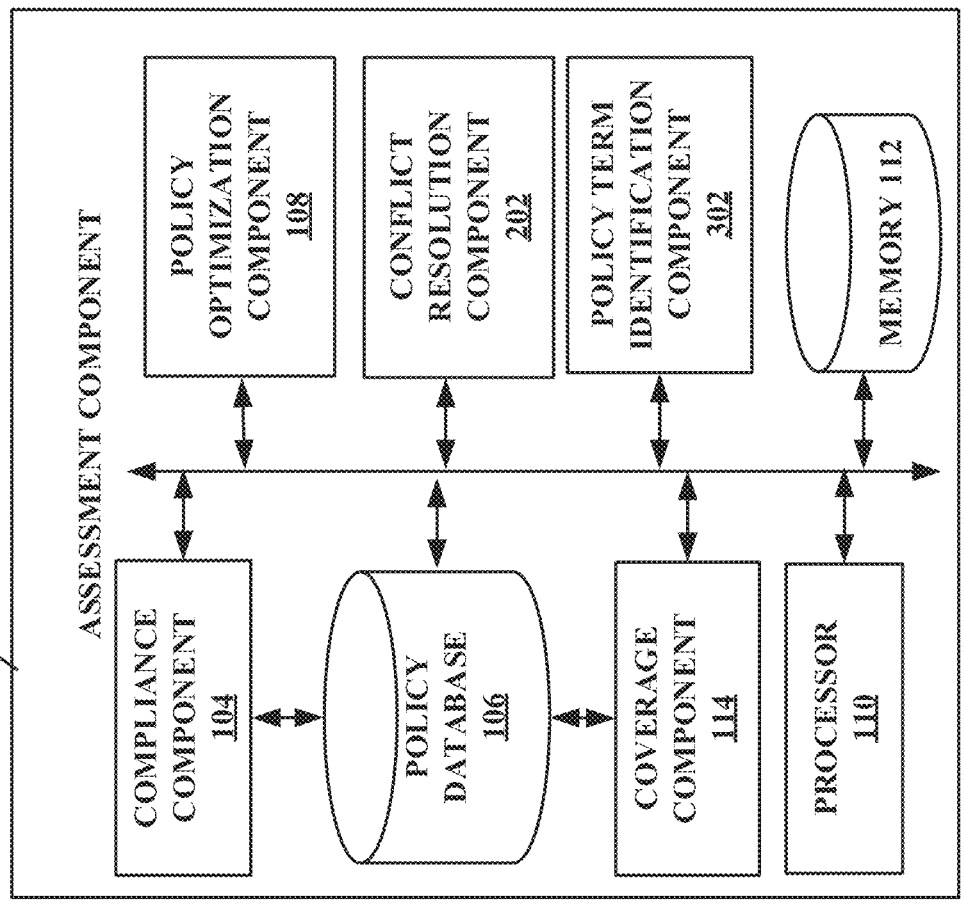
FIG. 3 illustrates another block diagram of an example, non-limiting system that facilitates assessing policy compliance comprising a policy term identification component and a conflict resolution component in accordance with one or more embodiments described herein.

FIG. 3 illustrates another block diagram of an example, non-limiting system that facilitates assessing policy compliance comprising a policy term identification component and a conflict resolution component in accordance with one or more embodiments described herein. Repetitive description of like elements employed in other embodiments described herein is omitted for sake of brevity.

In another embodiment, assessment system 300 can comprise a policy term identification component as a sub-component of the assessment component 102. The policy term identification component 302 can employ natural language processing to identify policy terms from unstructured electronic documents. For example, a semantic search can be used to assess and/or determine a policy associated with a specific electronic document. Additionally, some terms can have a higher relevance to specific types of polices. Therefore, an assessment of the terms of the electronic document can provide an indication of what type of policy is or should be associated with the electronic document.

Figure 4:
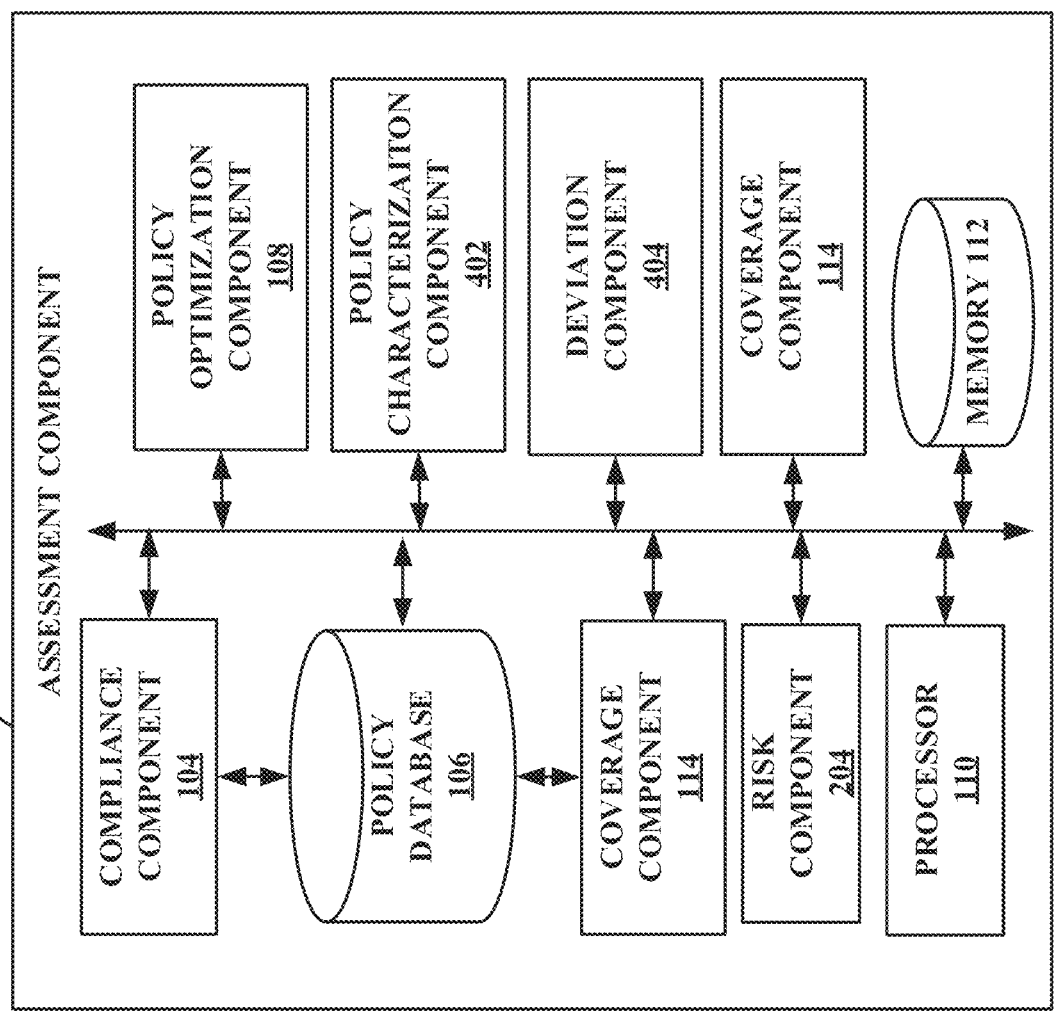
FIG. 4 illustrates another block diagram of an example, non-limiting system that facilitates assessing policy compliance comprising a risk component, a policy characterization component, and a deviation component in accordance with one or more embodiments described herein.

FIG. 4 illustrates another block diagram of an example, non-limiting system that facilitates assessing policy compliance comprising a risk component, a policy characterization component, and a deviation component in accordance with one or more embodiments described herein. Repetitive description of like elements employed in other embodiments described herein is omitted for sake of brevity.

In another embodiment, assessment system 400 can comprise a policy characterization component 402, and a deviation component 404 as sub-components of the assessment component 102. The policy characterization component 402 can determine structured policy data based on defined policy terms. The structured policy data can comprise a policy type, a policy semantic, and/or additional policy parameters. The policy data can be used to classify various policies and to compare the various policies against each other. For example, the policy can be characterized as requiring a high level of scrutiny (e.g., a policy associated with health records) or a low level of scrutiny (e.g. a policy associated with social media).

The deviation component 404 can identify a deviation associated with the policy based on the risk score (from the risk component 204) exceeding a threshold value. For example, if the risk score has been determined to have exceeded a threshold value, the deviation component can identify the deviation causing the increased risk score. Thus, the deviation 404 can be identified as a minor deviation, a moderate deviation, or an extreme deviation from the regulation. Additionally, the policy optimization component 108 can determine a change to the policy based on the deviation. For example, referring now to the example above with all lowercase letters, to mitigate the deviation in response to the assessment system 400 determining that the risk score is higher than a defined value, the policy optimization component 108 can change the policy to require both capital and lowercase password letters. Consequently, the password strength can be increased based on the combination of capitalized and lowercase letters. Thus, making the system less susceptible to risks and reducing the risk score.

Figure 5:
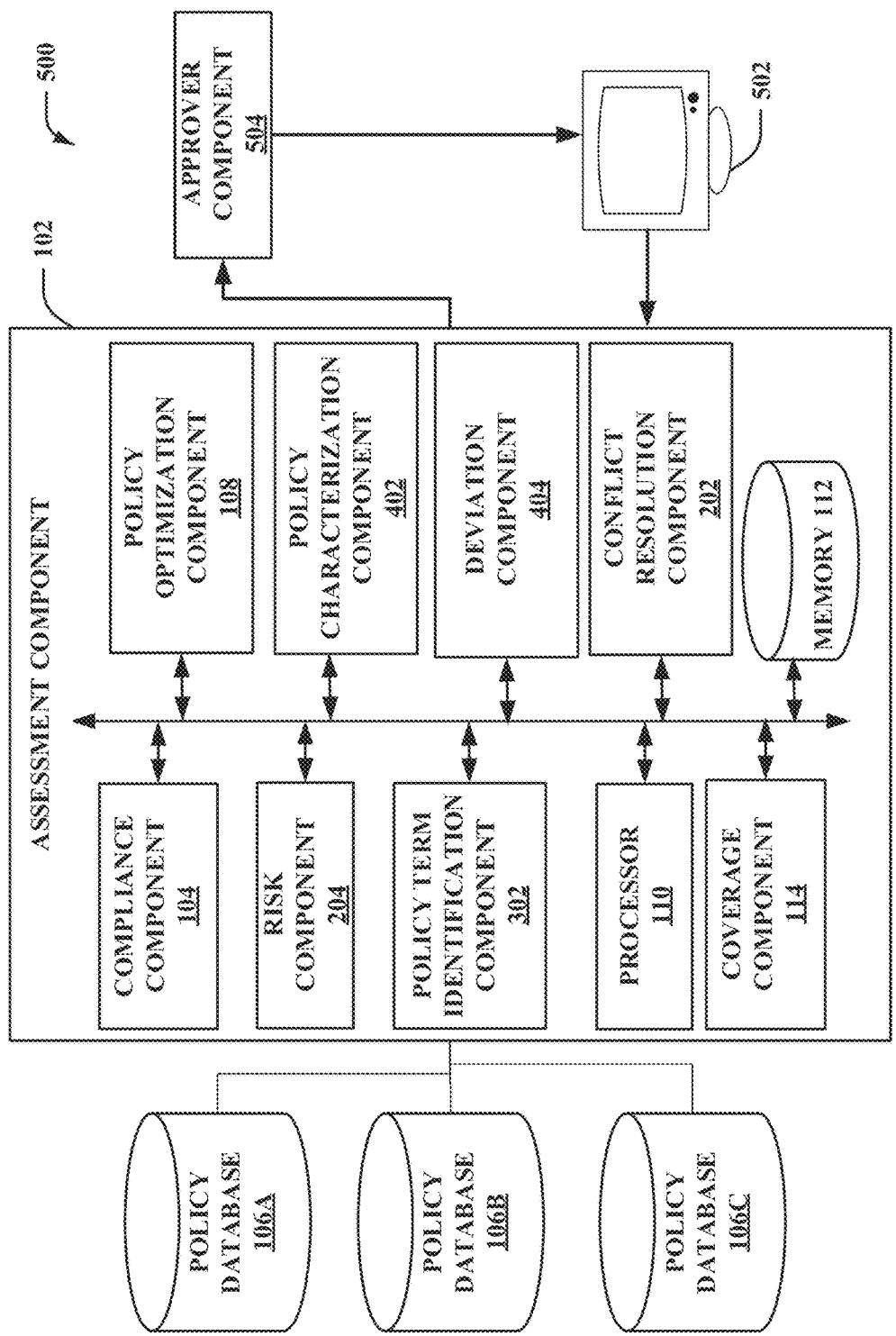
FIG. 5 illustrates an additional block diagram of example, non-limiting system that facilitates assessing policy compliance comprising an approver component and an end user device in accordance with one or more embodiments described herein.

FIG. 5 illustrates an additional block diagram of example, non-limiting system that facilitates assessing policy compliance comprising approver and an end user in accordance with one or more embodiments described herein. Repetitive description of like elements employed in other embodiments described herein is omitted for sake of brevity.

In yet another embodiment, assessment system 500 can comprise an approver component 504 and an end user device 502. The end user device 502 can be utilized to send policy data to the assessment component 102. For example, the end user device 502 can send a policy change request to the assessment component 102. The policy change request can be in relation to any policy associated with or stored at the policy databases 106A, 106B, 106C. The end user device 502 can also send new policies and additional policy data to be stored at the policy databases 106A, 106B, 106C. It should also be noted that the policy databases 106A, 106B, 106C can be external or internal to the assessment component 102. The assessment component 102 can validate or reject the policy change request, via the approver component 504, based on regulations referenced against the policy change. Additionally, the assessment component 102 can determine which policies are continually being violated by specific server devices. Thus, providing the assessment system 500 with yet another data point to remediate policy non-compliance. The approver component 504 can be configured to accept or reject requested policy changes whether the approver component 504 is internal or external to the assessment component 102. Furthermore, the approver component 504 can utilize an artificial intelligence and/or be an end user device operable to receive inputs from another end user device).

Figure 6:
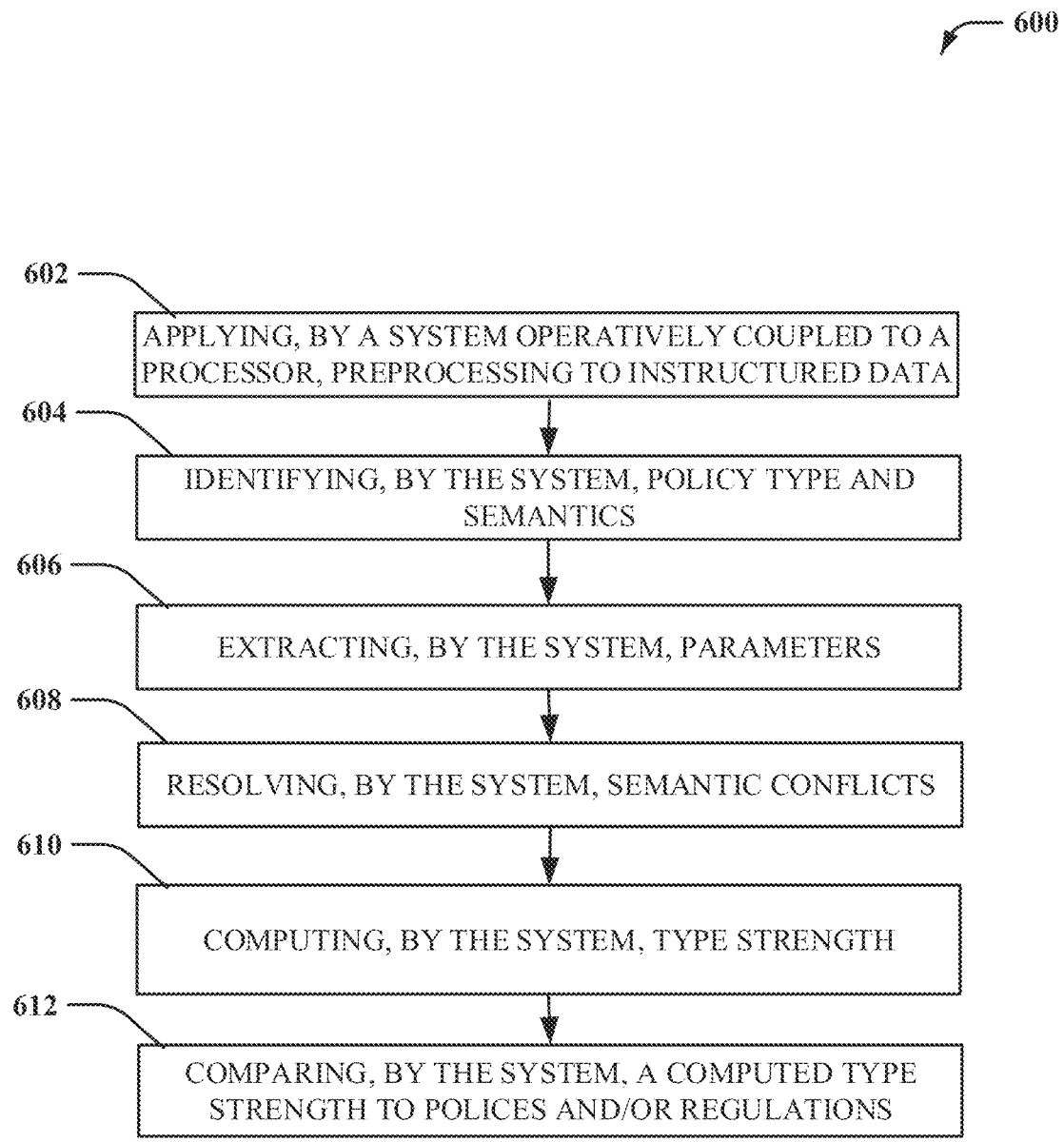
FIG. 6 illustrates a flow diagram of an example, non-limiting computer-implemented method that facilitates assessing policy compliance in accordance with one or more embodiments described herein.

FIG. 6 illustrates a flow diagram of an example, non-limiting computer-implemented method that facilitates assessing policy compliance in accordance with one or more embodiments described herein. Repetitive description of like elements employed in other embodiments described herein is omitted for sake of brevity.

The assessment component 102 can execute a method 600 comprising applying, by a system operatively coupled to a processor, preprocessing (e.g., via the policy term identification component 302) to unstructured data of a policy at element 602. The preprocessing can remove stop words and apply lemmatization to the policy. At element 604, method 600 can identify, by the system, a policy type and semantics associated with the policy type. The policy type can be identified via neural networks (e.g., convolutional neural network, support vector machine, etc.). At element 606, parameters can be extracted, by the system, from each policy by utilizing domain ontologies and then applying statistical modeling (e.g., conditional random field, recurrent neural networks, etc.). Based on the policy type and the parameters, semantic conflicts can be resolved, by the system, (e.g., via the conflict resolution component 202) at element 608. Policies can be classified, by the system, into high level categories (e.g., obligations, permissions, prohibitions, etc.). For example, if one policy comprises an obligation that conflicts with another policy's prohibition, then the conflict can be resolved (e.g., via the conflict resolution component 202). After the conflict is resolved, a type strength associated with the policy can be computed, by the system, at element 610 and compared against other policies and/or regulations at element 612.

Figure 7:
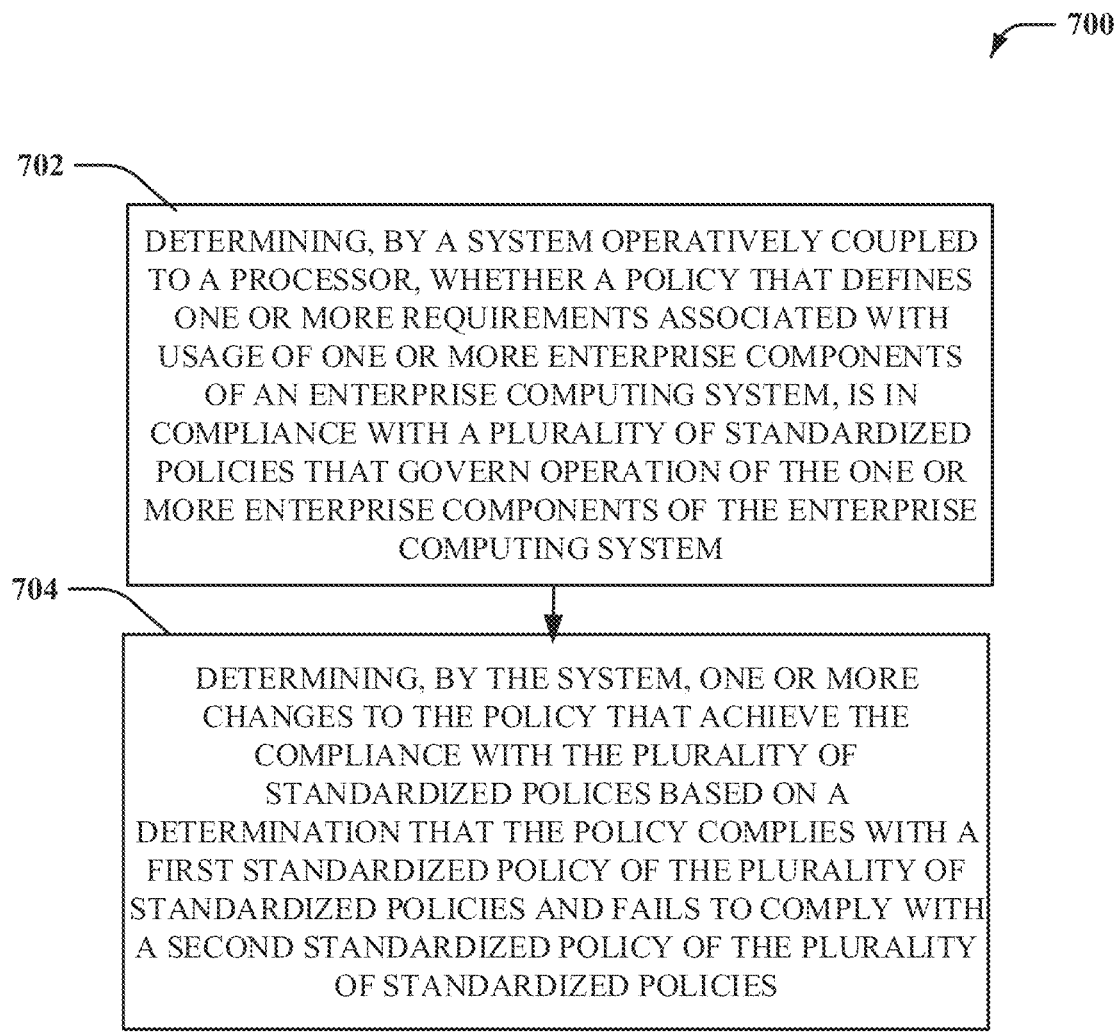
FIG. 7 illustrates a flow diagram of another example, non-limiting computer-implemented method that facilitates assessing policy compliance in accordance with one or more embodiments described herein.

FIG. 7 illustrates a flow diagram of another example, non-limiting computer-implemented method 700 that facilitates assessing policy compliance in accordance with one or more embodiments described herein. Repetitive description of like elements employed in other embodiments described herein is omitted for sake of brevity.

At element 702, the method 700 can comprise determining (e.g., via the compliance component 104), by a device operatively coupled to a processor, whether a policy that defines one or more requirements associated with usage of one or more enterprise components of an enterprise computing system, is in compliance with a plurality of standardized policies that govern operation of the one or more enterprise components of the enterprise computing system. Furthermore, at element 704, the method 700 can comprise determining (e.g., via the deviation component 404), by the device, one or more changes to the policy that achieve the compliance with the plurality of standardized polices based on a determination that the policy complies with a first standardized policy of the plurality of standardized policies and fails to comply with a second standardized policy of the plurality of standardized policies.

Figure 8:
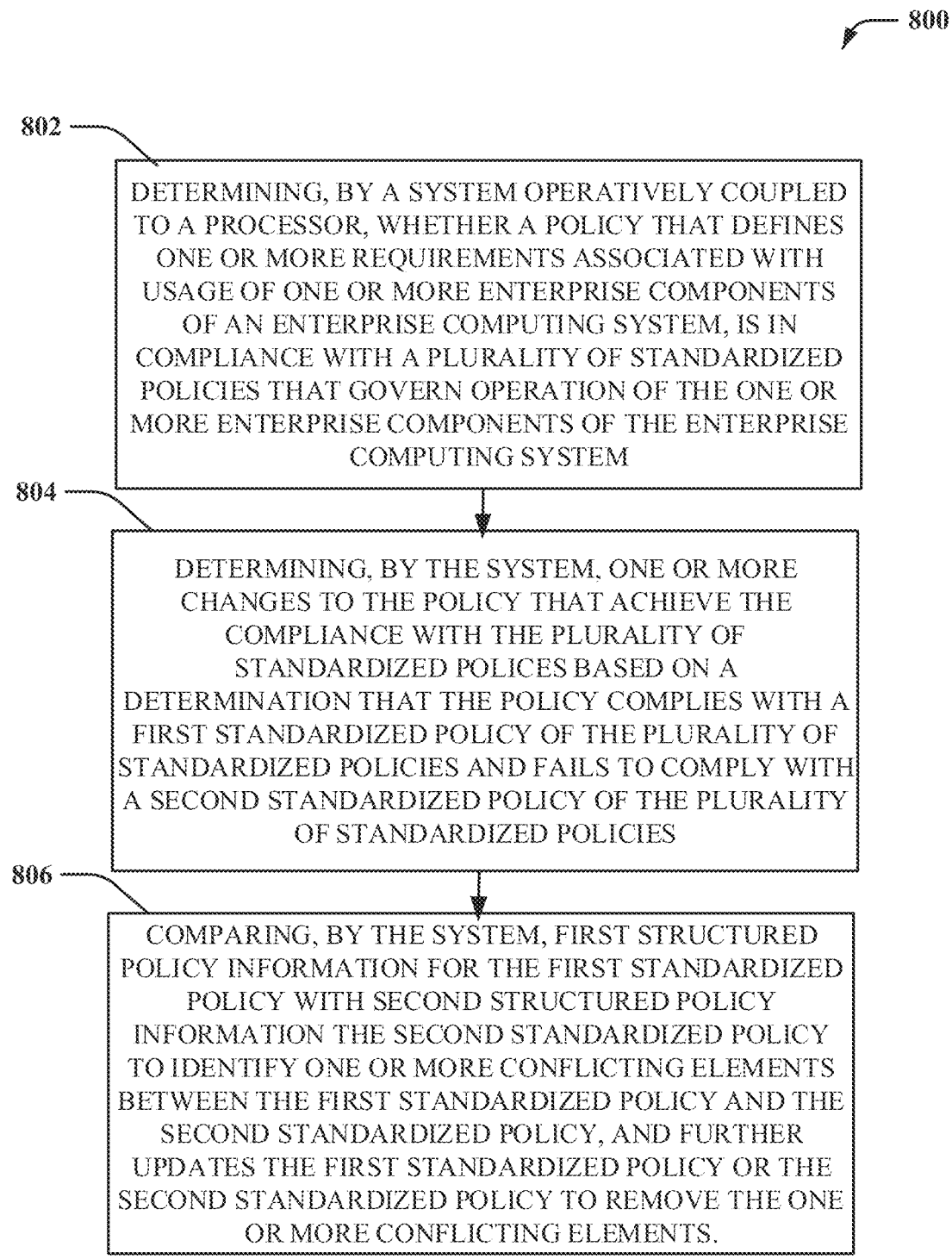
FIG. 8 illustrates a flow diagram of an example, non-limiting computer-implemented method that facilitates assessing policy compliance in accordance with one or more embodiments described herein.

FIG. 8 illustrates a flow diagram of an example, non-limiting computer-implemented method 800 that facilitates assessing policy compliance in accordance with one or more embodiments described herein. Repetitive description of like elements employed in other embodiments described herein is omitted for sake of brevity.

At element 802, the method 800 can comprise determining (e.g., via the compliance component 104), by a device operatively coupled to a processor, whether a policy that defines one or more requirements associated with usage of one or more enterprise components of an enterprise computing system, is in compliance with a plurality of standardized policies that govern operation of the one or more enterprise components of the enterprise computing system. Furthermore, at element 804, the method 800 can comprise determining (e.g., via the deviation component 404), by the device, one or more changes to the policy that achieve the compliance with the plurality of standardized polices based on a determination that the policy complies with a first standardized policy of the plurality of standardized policies and fails to comply with a second standardized policy of the plurality of standardized policies. Additionally, at element 806, the method 800 can comprise comparing (e.g., via the policy characterization component 402), by the device, first structured policy information for the first standardized policy with second structured policy information the second standardized policy to identify one or more conflicting elements between the first standardized policy and the second standardized policy, and further updates the first standardized policy or the second standardized policy to remove the one or more conflicting elements.

Figure 9:
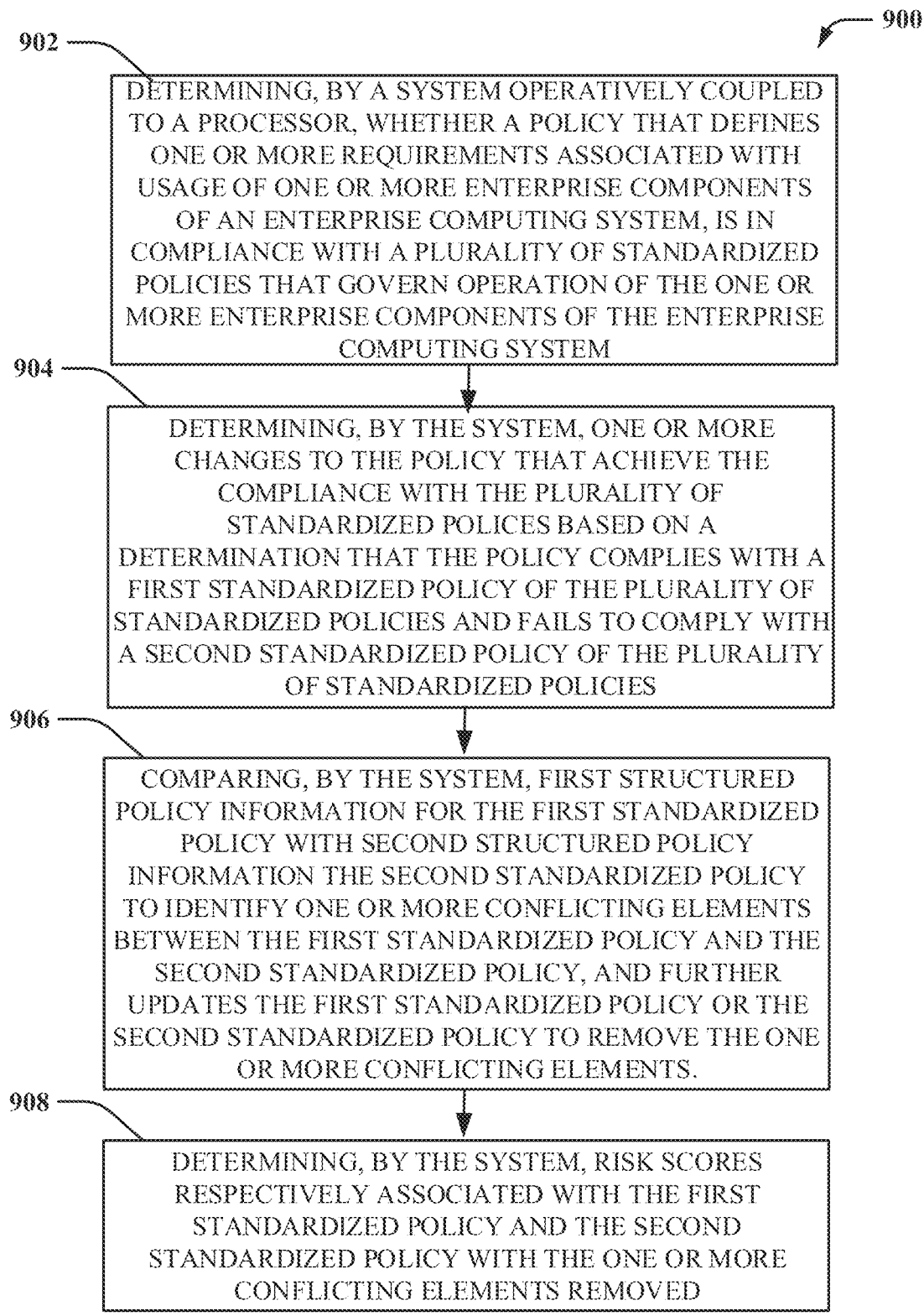
FIG. 9 illustrates a flow diagram of another example, non-limiting computer-implemented method that facilitates assessing policy compliance in accordance with one or more embodiments described herein.

FIG. 9 illustrates a flow diagram of another example, non-limiting computer-implemented method that facilitates assessing policy compliance in accordance with one or more embodiments described herein. Repetitive description of like elements employed in other embodiments described herein is omitted for sake of brevity.

At element 902, the method 900 can comprise determining (e.g., via the compliance component 104), by a device operatively coupled to a processor, whether a policy that defines one or more requirements associated with usage of one or more enterprise components of an enterprise computing system, is in compliance with a plurality of standardized policies that govern operation of the one or more enterprise components of the enterprise computing system. Furthermore, at element 904, the method 900 can comprise determining (e.g., via the deviation component 404), by the device, one or more changes to the policy that achieve the compliance with the plurality of standardized polices based on a determination that the policy complies with a first standardized policy of the plurality of standardized policies and fails to comply with a second standardized policy of the plurality of standardized policies. Additionally, at element 906, the method 900 can comprise determining, by the device, risk scores (e.g., via the risk component 204) respectively associated with the first standardized policy and the second standardized policy with the one or more conflicting elements removed.

Figure 10:
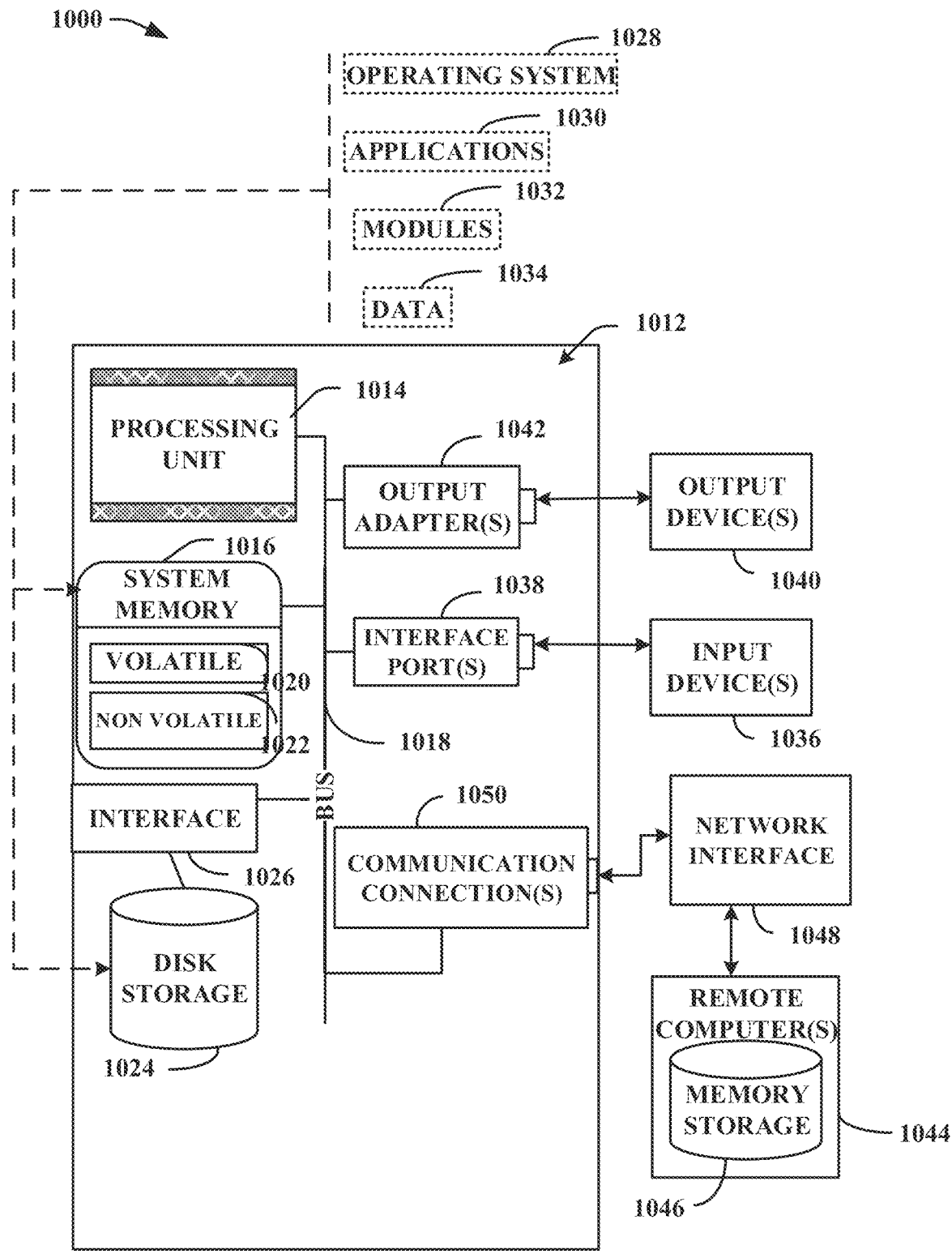
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a policy optimization component that determines one or more changes to a policy that achieve compliance with a plurality of standardized policies based on a determination that the policy complies with a first standardized policy of the plurality of standardized policies and fails to comply with a second standardized policy of the plurality of standardized policies;
        an assessment component comprising:
            a policy term identification component that processes, via the processor, and applying one or more convolutional neural networks, the policy resulting in a determination of a type of the policy;
            a conflict resolution component that compares first structured policy information for the first standardized policy with second structured policy information for the second standardized policy to identify one or more conflicting elements between the first standardized policy and the second standardized policy, and further updates the first standardized policy or the second standardized policy to remove the one or more conflicting elements; and
            a risk component that determines risk scores respectively associated with the first standardized policy and the second standardized policy with the one or more conflicting elements removed; and
        wherein the policy optimization component selects one of the first standardized policy or the second standardized policy as an optimal policy based on association with a lowest risk score and further determines the one or more changes to the policy to bring the policy into compliance with the optimal policy.

2. The system of claim 1, wherein the computer executable components further comprise:
    a coverage component that determines whether the policy is within a scope of a regulation that governs the operation of the one or more enterprise components of the enterprise computing system, wherein the type of the policy is associated with an electronic document and is determined by the convolutional neural networks and employing a semantic search of one or more terms of the electronic document, wherein the one or more terms are associated with the type of the policy.

3. The system of claim 1, wherein the computer executable components further comprise:
    a policy term identification component that employs natural language processing to identify defined policy terms for the first standardized policy and the second standardized policy, respectively, from unstructured electronic documents respectively describing requirements of the first standardized policy and the second standardized policy.

4. The system of claim 3, wherein the computer executable components further comprise:
    a policy characterization component that determines the first structured policy information and the second structured policy information based on the defined policy terms, wherein the first structured policy information and the second structured policy information are selected from a group consisting of the type of the policy, a policy semantic, and the one or more policy parameters.

5. The system of claim 1, wherein the computer executable components further comprise:
    a policy term identification component that employs natural language processing to identify one or more defined policy terms for the policy from an unstructured electronic document describing the one or more requirements of the policy; and
    a policy characterization component that determines structured policy information for the policy based on the one or more defined policy terms, wherein the one or more defined policy terms identify the type of the policy, a semantic of the policy, and the one or more policy parameters.

6. The system of claim 5, wherein the computer executable components further comprise:

a risk component that determines a risk score associated with the policy based on the structured policy information and an execution environment associated with execution of the policy.

7. The system of claim 6, wherein the computer executable components further comprise
a deviation component that identifies a deviation associated with the policy based on the risk score exceeding a threshold value, wherein the policy optimization component further determines the one or more changes based on the deviation, and wherein the one or more changes mitigate the deviation.

8. A computer program product facilitating assessing policy compliance, the computer program product comprising a non-transitory computer readable storage medium having program instructions embodied therewith, the program instructions executable to:
determine one or more changes to a policy that achieve compliance with a plurality of standardized policies based on a determination that the policy complies with a first standardized policy of the plurality of standardized policies and fails to comply with a second standardized policy of the plurality of standardized policies;
process and apply, via one or more convolutional neural networks, the policy resulting in a determination of a type of the policy;
compare first structured policy information for the first standardized policy with second structured policy information for the second standardized policy to identify one or more conflicting elements between the first standardized policy and the second standardized policy, and further updates the first standardized policy or the second standardized policy to remove the one or more conflicting elements;
determine risk scores respectively associated with the first standardized policy and the second standardized policy with the one or more conflicting elements removed; and
select one of the first standardized policy or the second standardized policy as an optimal policy based on association with a lowest risk score and further determine the one or more changes to the policy to bring the policy into compliance with the optimal policy.

9. The computer program product of claim 8, wherein the program instructions are further executable to:
determine whether the policy is within a scope of a regulation that governs the operation of the one or more enterprise components of the enterprise computing system.

10. The computer program product of claim 8, wherein the program instructions are further executable to:

employ natural language processing to identify defined policy terms for the first standardized policy and the second standardized policy, respectively, from unstructured electronic documents respectively describing requirements of the first standardized policy and the second standardized policy.

11. The computer program product of claim 10, wherein the program instructions are further executable to:
determine the first structured policy information and the second structured policy information based on the defined policy terms, wherein the first structured policy information and the second structured policy information are selected from a group consisting of the policy type, a policy semantic, and the one or more policy parameters.

12. A computer-implemented method, comprising:
determining, by a system operatively coupled to a processor, one or more changes to a policy that achieve compliance with a plurality of standardized policies based on a determination that the policy complies with a first standardized policy of the plurality of standardized policies and fails to comply with a second standardized policy of the plurality of standardized policies;
processing and applying, by the system, via one or more convolutional neural networks, the policy resulting in a determination of a type of the policy;
comparing first structured policy information for the first standardized policy with second structured policy information the second standardized policy to identify one or more conflicting elements between the first standardized policy and the second standardized policy, and further updates the first standardized policy or the second standardized policy to remove the one or more conflicting elements;
determining risk scores respectively associated with the first standardized policy and the second standardized policy with the one or more conflicting elements removed; and
selecting one of the first standardized policy or the second standardized policy as an optimal policy based on association with a lowest risk score and further determine the one or more changes to the policy to bring the policy into compliance with the optimal policy.

13. The computer-implemented method of claim 12, further comprising:
determining whether the policy is within a scope of a regulation that governs the operation of the one or more enterprise components of the enterprise computing system.

* * * * *